UNITED STATES PATENT OFFICE.

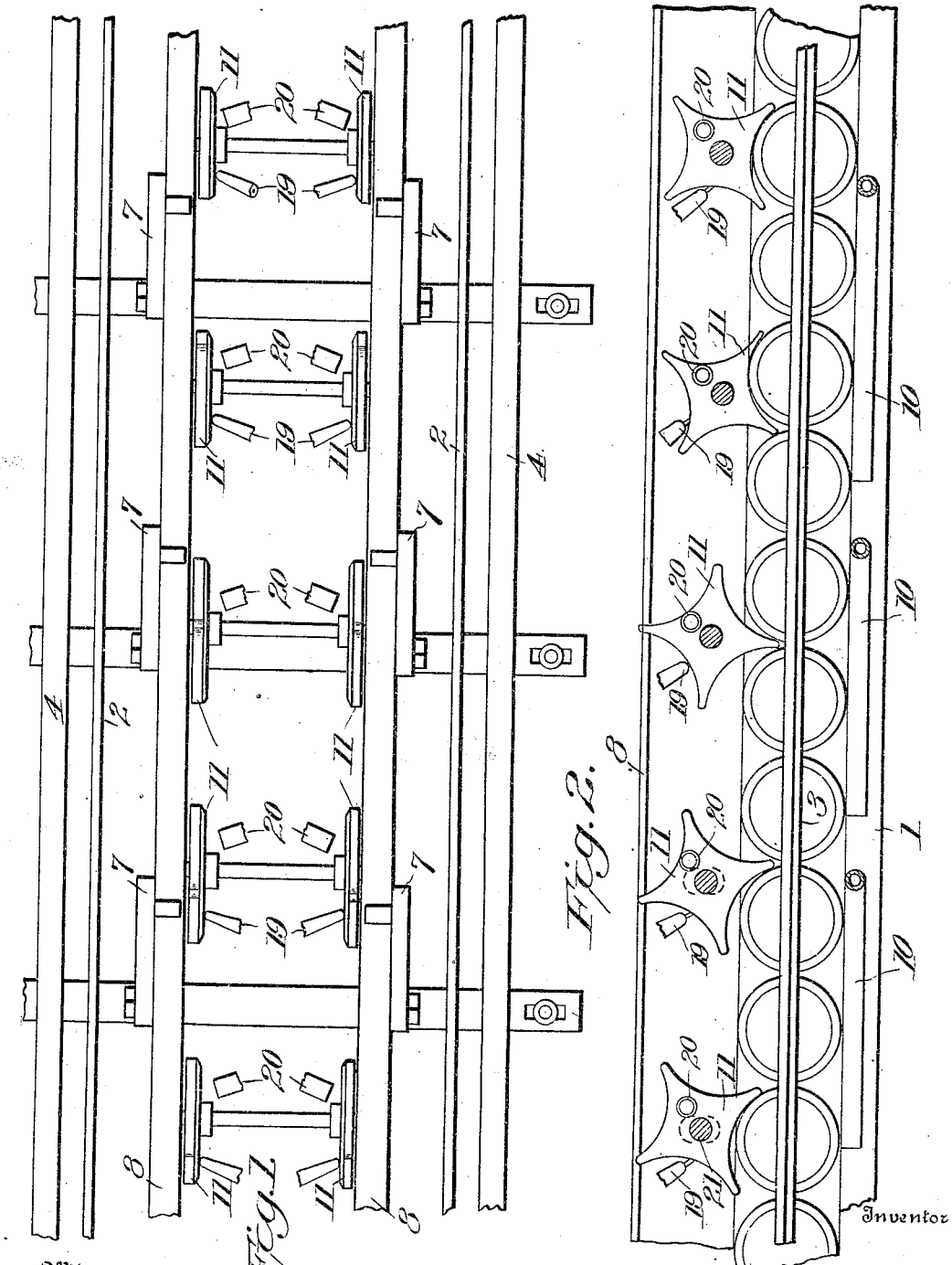

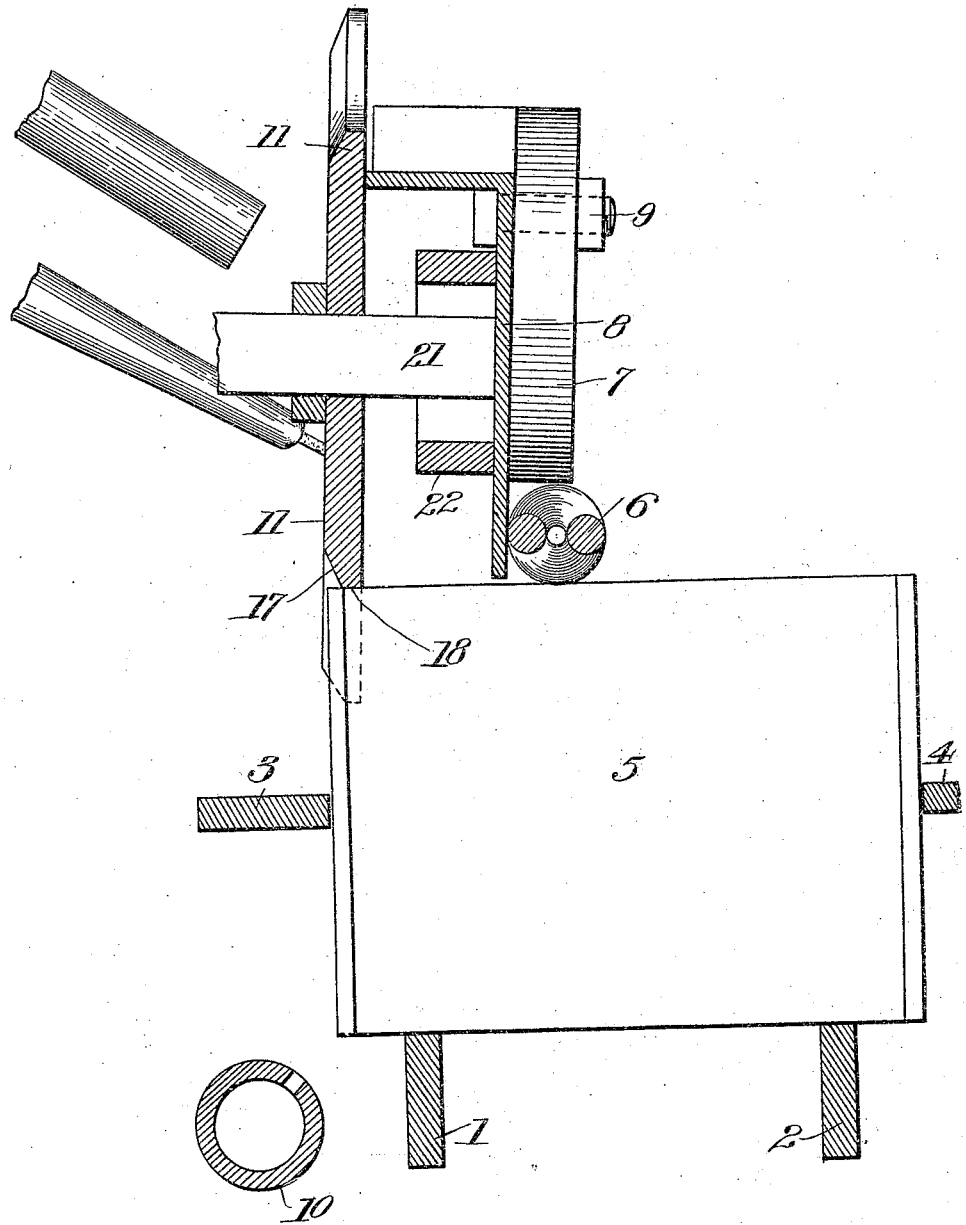

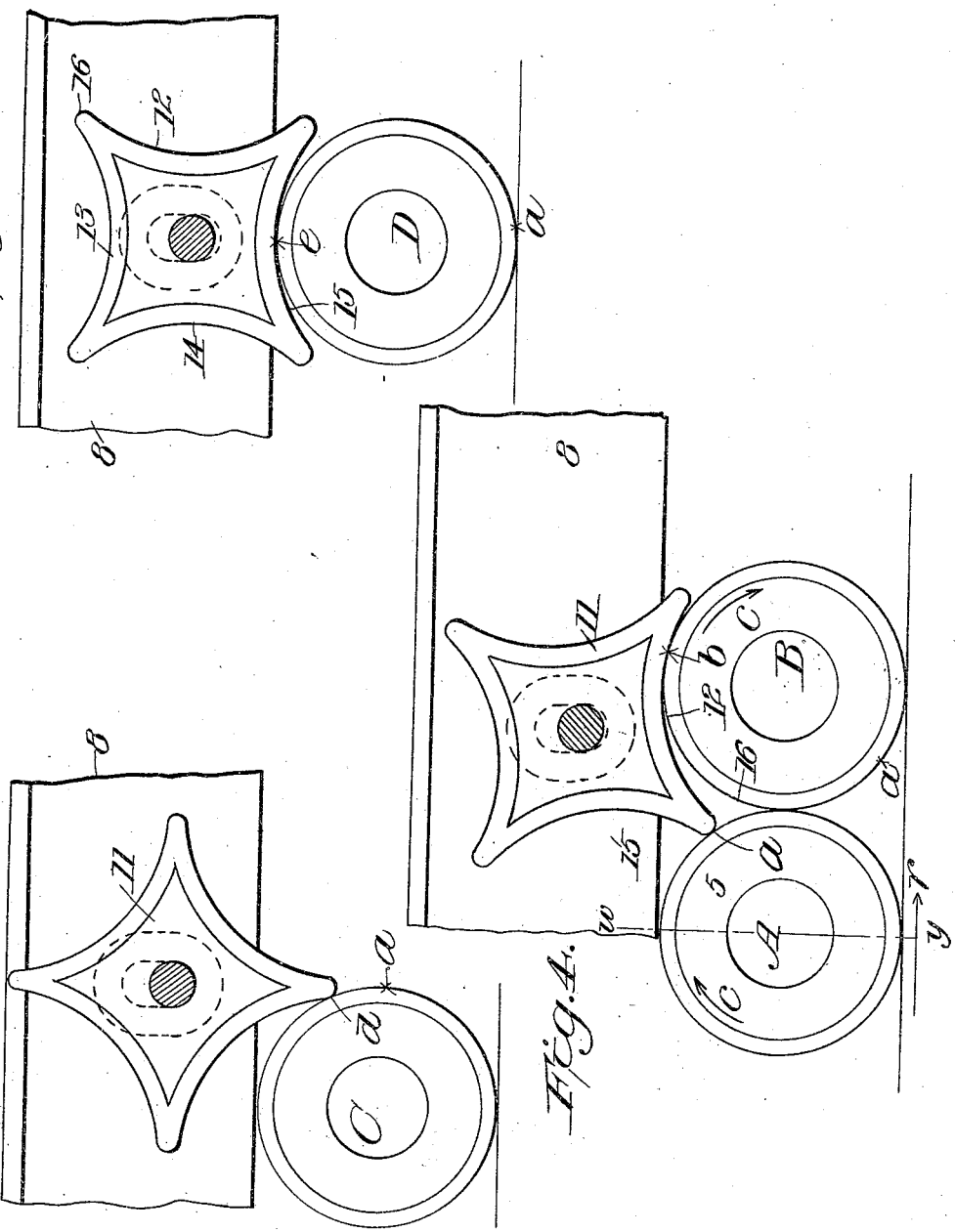

DANIEL P. ROBINSON, OF BALTIMORE, MARYLAND, ASSIGNOR TO CONTINENTAL CAN COMPANY, OF BALTIMORE, MARYLAND, A CORPORATION OF NEW JERSEY.

CAN-SOLDERING MACHINE.

959,388. Specification of Letters Patent. Patented May 24, 1910.

Application filed May 25, 1909. Serial No. 498,128.

*To all whom it may concern:*

Be it known that I, DANIEL P. ROBINSON, a citizen of the United States, residing at Baltimore, in the State of Maryland, have invented certain new and useful Improvements in Can-Soldering Machines, of which the following is a description, reference being had to the accompanying drawing and to the letters and figures of reference marked thereon.

The invention relates to new and useful improvements in can soldering machines, and more especially to end seaming machines where the end of the can is conveyed to the soldering iron and is rotated in contact with the iron.

An object of the invention is to provide a soldering machine with a rotating soldering iron which is so shaped and supported that the extent of contact of the iron on the end seam is greater than the travel of the can, while in contact with the iron.

A further object of the invention is to provide a soldering machine with a rotating soldering iron, which has a plurality of concaved contacting surfaces for applying the solder to the can.

A further object of the invention is to provide a can soldering machine with a plurality of soldering irons which are independently rotatable, which are also independently vertically movable and each of which is provided with a concaved contacting surface for applying the solder to the cans.

These and other objects will in part be obvious, and will in part be hereinafter more fully described.

In the drawings which show by way of illustration one embodiment of the invention; Figure 1 is a top plan view of a portion of a soldering machine having my invention applied thereto. Fig. 2 is a side view of a portion of one of the run ways showing the soldering irons in side elevation. Fig. 3 is an enlarged sectional view through one of the run ways and also through one of the soldering irons. Fig. 4 is an enlarged detail showing the iron in one position relative to the can. Fig. 5 is a similar view showing the iron in a different position. Fig. 6 is a view similar to Fig. 4, showing the iron in still another position relative to the can.

The soldering machine as herein shown is provided with the usual run way for the cans which consists of supporting rails 1, 2 and guiding rails 3 and 4. The can 5, is carried along the run way as herein shown, by a feed chain 6, (see Fig. 3,) which is held in contact with the cans by suitable weights 7, pivoted to the framework 8, by a pivot bolt 9. These parts are of the usual construction and form no part of my present invention and are herein shown merely for the purpose of illustration.

It is obvious that in place of the feed chain, any suitable driving mechanism may be used, the essential features being that the cans are conveyed one after another to the soldering irons, and are rotated while in contact with the soldering irons.

A suitable burner 10 may be provided for heating the end seam of the can.

Disposed along the run way for the cans, are soldering irons 11, which may be of any desired number. Said irons are so spaced that when the cans are brought into rolling contact therewith, a different portion of the end seam will make contact with the adjacent irons so that as the can passes through the machine, the entire seam will pass in contact with an iron one or more times. That is to say, if the iron shown at the left hand in Fig. 2 contacts with the end seam for a quarter of its circumference, the adjacent iron will be preferably so disposed as to contact with the can at another quarter of its circumference, although it is usually desirable that the portion brought in contact with the second iron shall slightly overlap the portion brought into contact with the first iron. The third iron will contact with still a different portion of the end seam. The same is true of the other irons so that as above noted, the entire end seam in passing through the machine, will be brought one or more times in contact with an iron.

In Fig. 2, I have shown a soldering machine with two run ways and the can is passed along one run way where one end seam is soldered and returned along the other run way, where the other end seam is soldered. Each of the soldering irons as herein shown, consists of a rotating member which is provided with a plurality of concaved contacting surfaces 12, 13, 14 and 15. These contacting surfaces are concaved and equally disposed relative to the axis of the iron. The curvature of the concaved part is slightly less than the curvature of the can which is to be soldered, as is clearly shown in Fig. 6. The projecting parts formed by the meeting of the concaved surfaces, are rounded off as at 16 (see Fig. 6). The concaved edges of the iron are also tapered as at 17 (see Fig. 3), so as to provide a comparatively narrow soldering face 18, which will engage the end seam and supply the same with solder. Solder is fed to the iron in wire form preferably by any suitable solder feeding mechanism, the position of which is indicated at 19 (Fig. 2). The iron is also heated by a suitable burner 20. The irons are each mounted so as to rotate freely by means of a trunnion or shaft 21, which is mounted in suitable bearings 22. The bearings 22 are so constructed that the supporting shaft for the irons may move vertically. The bearings 22 are also so disposed that when a can is passing underneath the iron, the iron is raised slightly from the bearings so that the weight of the iron rests on the can which greatly increases the efficiency of the contact.

In the operation of my device, the cans are fed along the run-way and are rotated in the usual manner. The can 5 when in the position A (Fig. 4) will engage the end of the iron 16, at the point $a$. The can is rotating in the direction of the arrow $c$ and consequently is moving along the run way in the direction of the arrow $r$. The can will therefore, at once cause the iron 11 to rotate on its axis and lift the concaved portion 12 from contact with the adjacent can indicated by the position B. The point of contact between the iron 11 and the can in the position B at the time when the can leaves the iron is indicated at $b$. The continued movement of the can 5 from the position A, carries the iron to the position shown in Fig. 5, and in this figure, when the can is positioned at C, the point of first contact $a$ has moved away from the front of the iron and the iron has been drawn along the seam from the point $a$ to the point $d$. As the can continues its movement to the position D, (Fig. 6,) the can is now directed underneath the axis of the iron and the contact between the iron and the can is indicated by the point $e$. It will therefore, be seen that as the can passes from the position A through the position C to the position D, the point of initial contact $a$, has moved to the position shown in Fig. 6, and the end seam has been brought into contact with the iron through an arc of substantially 180 degrees. As the can continues its movement, the point of contact with the iron will now move to the right to the point indicated at $b$ (Fig. 4) and meanwhile, the point of initial contact $a$ moves to the position shown at the right in Fig. 4, and the end seam has therefore, been brought into contact with the iron from the point $b$ in the direction of the arrow $c$ to the point $a$. During this time, the can is moved from the position B (Fig. 4) or through a distance a little more than half the length of the extent of contact of the iron on the end seam. It will thus be seen by my improved form of iron, that the length of contact on the end seam is considerably greater than the actual travel of the can, while in contact with the iron. It will further be seen, that the position of initial contact is at the right of a vertical line $y$, $y$, passing centrally through the can and that this point of contact will travel to the left until it reaches a vertical line passing centrally through the can as shown in Fig. 6, and then it again travels to the right to the position illustrated by the position B of the can in Fig. 4. It will therefore, be seen that the point of contact between the can and the iron travels first in a direction opposite to the direction of movement of the can along the run way. By this traveling of the point of contact in the direction opposite to the direction of travel of the can, I am able to make contact with the end seam to a considerably greater extent than the actual travel of the can.

Having thus particularly described my invention, what I claim as new and desire to secure by Letters Patent, is:—

1. A can soldering machine including in combination, a soldering iron, means for conveying the cans to said iron, means for supporting the iron so that it may freely rotate, said iron having a plurality of similarly shaped and disposed cut-away portions adapted to be brought into contact successively with the cans.

2. A can soldering machine including in combination a soldering iron, means for conveying the cans to said iron, means for supporting said iron so that it may freely rotate, said iron having a plurality of concaved soldering surfaces.

3. A can soldering machine including in combination a soldering iron, means for conveying the cans to said iron, means for supporting said iron so that it may be freely rotated by the cans, said iron having a plurality of curved soldering surfaces of a less curvature than the curvature of the cans, said surfaces being located adjacent each other and adapted to be brought into contact successively with the cans.

4. A can soldering machine including in combination a soldering iron, means for conveying the cans to said iron, means for supporting said iron so that it may be freely rotated by the cans, said supporting means being so constructed as to allow said iron to move vertically, said iron having a plurality of concaved soldering surfaces.

5. A soldering machine including in combination, a run way for the cans, means for feeding the cans along said run way, a soldering iron, means for supporting said soldering iron, whereby it may rest on said cans and be freely rotated thereby, said iron having a concave soldering-surface.

6. A soldering machine including in combination, a plurality of soldering irons, means for conveying the cans to said soldering irons, means for pivotally supporting said soldering irons whereby the same may rest on said cans, and be rotated thereby, each of said irons having a plurality of concaved soldering surfaces, said irons being so disposed relative to each other, as to contact with different portions of the end seam.

In testimony whereof I affix my signature, in presence of two witnesses.

DANIEL P. ROBINSON.

Witnesses:
JOHN COYLE,
JOHN W. HEWES.